United States Patent [19]
Padrick

[11] 3,895,827
[45] July 22, 1975

[54] TRACTOR-TRAILER FIFTH WHEEL SAFETY LOCK

[76] Inventor: James D. Padrick, 420 N. 12th, Beach Grove, Ind. 46107

[22] Filed: May 30, 1974

[21] Appl. No.: 474,799

[52] U.S. Cl. .............................. 280/432; 200/61.91
[51] Int. Cl. ............................................. B62d 53/10
[58] Field of Search .................. 280/432; 200/61.91

[56] References Cited
UNITED STATES PATENTS

| | | | |
|---|---|---|---|
| 2,400,738 | 5/1946 | Brown | 280/432 |
| 2,468,705 | 4/1949 | Price | 280/432 |
| 2,692,147 | 10/1954 | Whitney | 280/432 |
| 3,242,280 | 3/1966 | Krieger | 200/61.91 |
| 3,556,559 | 1/1971 | Interisano | 280/432 X |

FOREIGN PATENTS OR APPLICATIONS

| | | | |
|---|---|---|---|
| 1,219,280 | 1/1971 | United Kingdom | 280/432 |
| 1,240,554 | 7/1971 | United Kingdom | 280/432 |

*Primary Examiner*—Leo Friaglia
*Attorney, Agent, or Firm*—Woodard, Weikart, Emhardt & Naughton

[57] ABSTRACT

A safety lock for limiting relative pivotal motion between a truck and a connected trailer. A fifth wheel is pivotally mounted to the rear platform of the truck. A stop block is movably mounted to the platform with control means provided to pivot the block upwardly into an arcuate formed recess of a plate fixedly attached to the bottom forward edge portion of the trailer. The arcuate recess extends through an angle not greater than the included steering angle through which the front wheels of the truck are turnable.

2 Claims, 6 Drawing Figures

TRACTOR-TRAILER FIFTH WHEEL SAFETY LOCK

BACKGROUND OF THE INVENTION

1. Field of the Invention

This invention is in the field of locking devices for limiting pivotal motion between a truck and trailer.

2. Description of the Prior Art

Various arrangements have been devised to prevent or minimize tendencies of tractor-trailers to jackknife. A representative sample of the prior art is disclosed in the following U.S. Pat. Nos.:

2,462,211 issued to C. L. Moore
2,652,262 issued to W. G. Sherry
3,420,548 issued to C. M. Wakeman
3,733,090 issued to A. T. Keller
3,774,941 issued to H. H. Durr Many of the prior art devices for preventing jackknifing fasten the truck to the trailer thereby providing for cumbersome devices which require maintenance. Disclosed herein is a slidably mounted block which limits relative pivotal motion between the truck and trailer while not requiring any additional fastening of the truck to the trailer, other than the conventional fifth wheel assembly. Some of the prior art devices utilize pins projecting into various assemblies of the tractor-trailer combination. The slidably mounted block disclosed herein is relatively simple as compared to the prior art devices and fits into an arcuate shaped recess which opens through the edge of a plate thereby not requiring the alignment of a pin with a slot such as utilized in the prior art devices.

SUMMARY OF THE INVENTION

One embodiment of the present invention is a tractor-trailer fifth wheel safety lock comprising a truck having a rearwardly extending platform, a fifth wheel pivotally mounted atop the platform and including a rearwardly opening slot, a trailer having a main frame with a front edge portion, a plate fixedly mounted beneath and to the main frame at the front edge portion and including a projection extending down from the block into the slot, a forward edge portion with an arcuate recess opening through the forward edge portion and stop surfaces positioned at opposite ends of said recess, the recess forms an arc of a maximum angle about the projection, a stop block movably mounted to said platform, means connected to said block and operable to move the block into and out of the arcuate recess, said block contactable against the stop surfaces when in the recess to limit relative pivotal movement between the block and the fifth wheel.

It is an object of the present invention to provide a new and improved device for preventing jackknifing of a tractor-trailer.

A further object of the present invention is to provide a combination of a truck and trailer secured together in such a manner to prevent jackknifing.

Related objects and advantages of the present invention will be apparent from the following description.

DESCRIPTION OF THE PREFERRED EMBODIMENT

Figure 1:
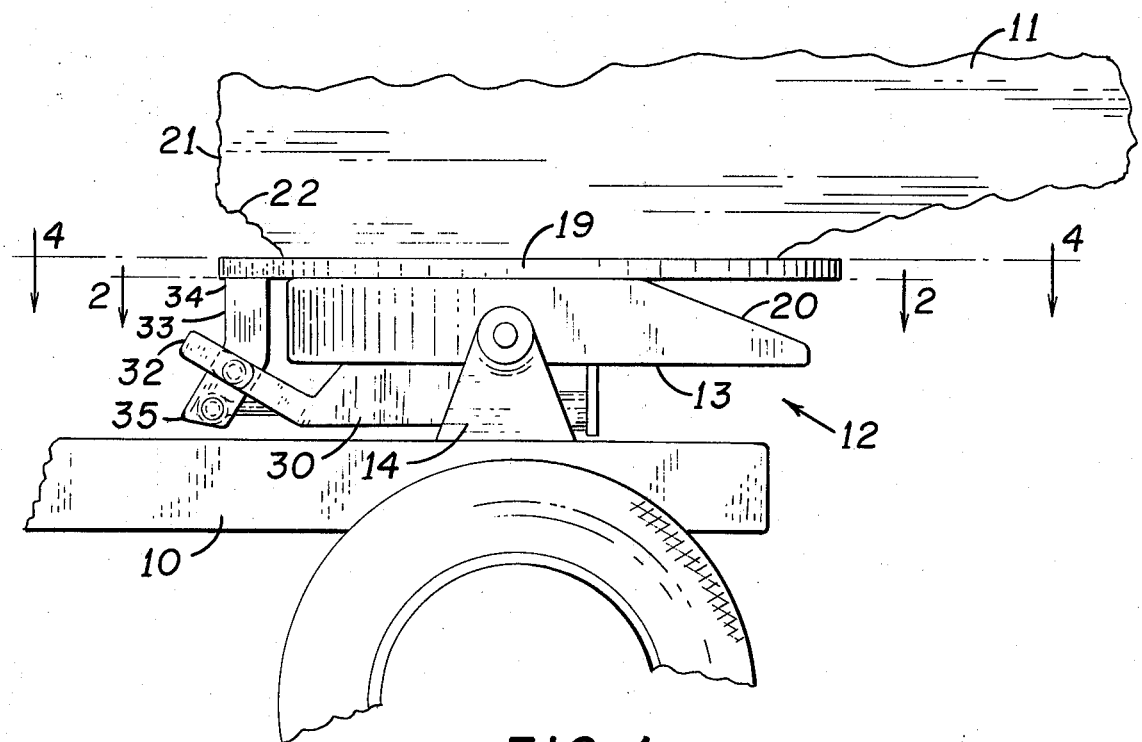
FIG. 1 is a fragmentary side view of a trucktrailer combination incorporating the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 3:
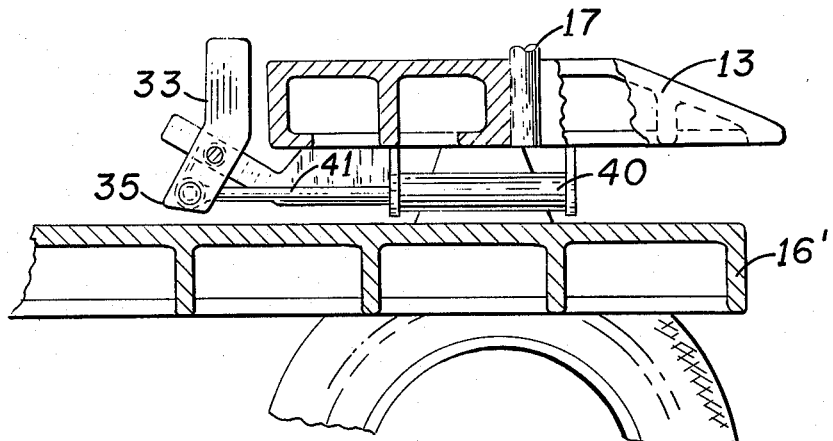
FIG. 3 is a cross-sectional view taken along the line 3—3 of FIG. 2 and viewed in the direction of the arrows.

Referring now more particularly to FIG. 1, there is shown a truck 10 connected to a trailer 11 by a fifth wheel assembly 12. Assembly 12 includes a disc shaped fifth wheel 13 pivotally mounted to brackets 14 and 15 which, in turn, are fixedly mounted to the rearwardly extending platform 16' (FIG. 3) of truck 10.

Figure 2:
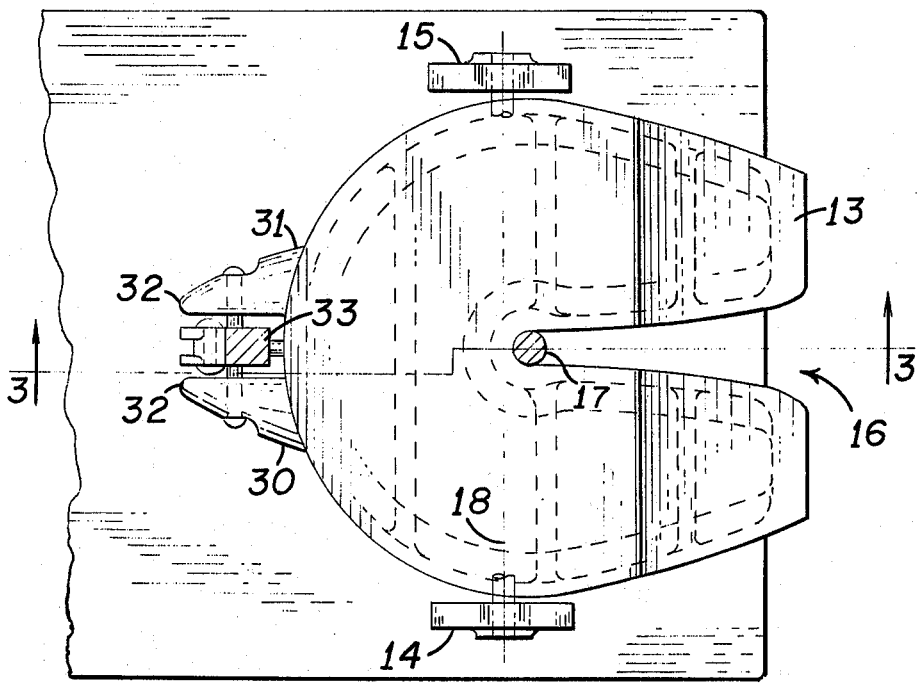
FIG. 2 is a cross-sectional view taken along the line 2—2 of FIG. 1 and viewed in the direction of the arrows.

Fifth wheel 13 has a rearwardly opening slot 16 (FIG. 2) into which rod 17 projects with the rod being fixedly mounted to trailer 11. Fifth wheel 13 is of conventional design and is pivotable around axis 18 thereby allowing plate 19 attached to trailer 11 to contact upwardly slanting surface 20 as the truck is backed beneath trailer 11.

Figure 4:
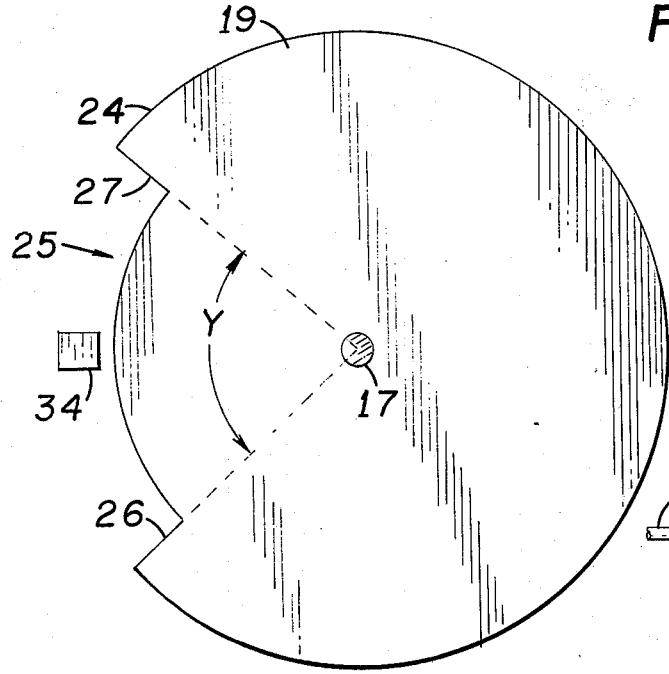
FIG. 4 is a cross-sectional view taken along the line 4—4 of FIG. 1 and viewed in the direction of the arrows.

Trailer 11 has a main frame 21 with a front edge portion 22 beneath which plate 19 is fixedly mounted. Plate 19 (FIG. 4) has a forward edge portion 24 with an arcuate shaped recess 25 opening through forward edge portion 24. A pair of stop surfaces 26 and 27 are positioned at the opposite ends of recess 25. Recess 25 extends through an arc of a maximum angle $y$ formed by lines extending from stop surfaces 26 and 27 to the center of pin 17. Plate 18 is generally circular in configuration.

Figure 6:
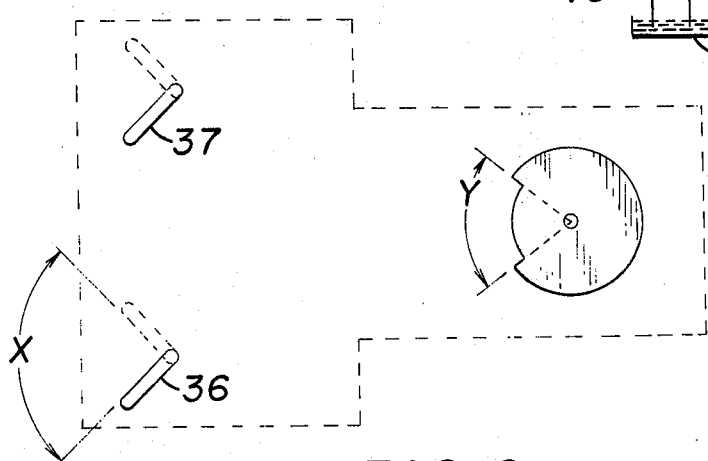
FIG. 6 is a block diagram illustrating the turning angle of the truck front wheels and the arc of the arcuate shaped recess of the trailer plate.

A pair of spaced apart arms 30 and 31 (FIG. 2) are fixedly mounted to and beneath fifth wheel 13. Each arm 30 and 31 extends forwardly of wheel 13 and upwardly having forward distal ends 32 spaced apart from platform 16'. A stop block 33 is pivotally mounted to distal ends 32 between the top end 34 and bottom end 35 of the stop block. Means connected to block 33 is provided to move the block into and out of the arcuate shaped recess 25 (FIG. 4) with the block being contactable against stop surfaces 26 and 27 to limit relative pivotal movement of the truck with respect to the trailer. The front wheels 36 and 37 are each movable through a steering angle $x$ (FIG. 6) which is not less than the angle $y$ of the arcuate shaped recess.

Figure 5:
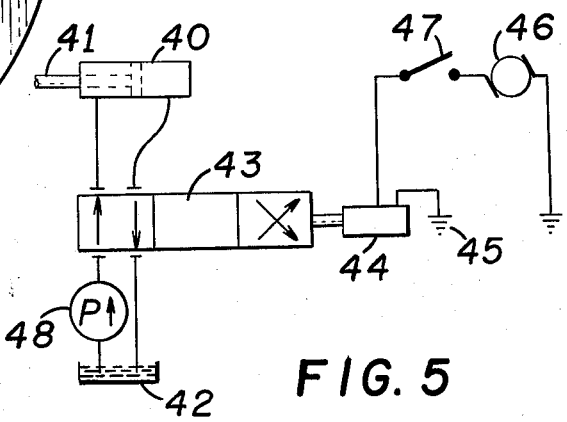
FIG. 5 is a schematic illustration of one method of operating the safety lock shown in FIG. 1.

The means provided to pivot stop block 33 may include hydraulic, electric or pneumatic devices or radio controlled devices. The means shown in the drawing include a cylinder motor 40 (FIG. 3) fixedly mounted to wheel 13. Cylinder motor 40 includes an extendable piston rod 41 pivotally mounted to the bottom end 35 of stop block 33. By extending rod 41, stop block 33 is caused to pivot into recess 25 whereas retraction of rod 41 causes the stop block to pivot out of the arcuate shaped recess. Various means may be provided to control movement of piston rod 41. For example, a source of pressurized fluid 42 (FIG. 5) may be connected through valve 43 to cylinder motor 40. Valve 43 may be operated by a solenoid 44 connected between ground potential 45 and a source of electrical energy 46 with an electrical switch 47 disposed between source 46 and solenoid 44. With switch 47 in the open position, valve 43 is normally positioned as shown in FIG. 5 thereby causing the piston rod to retract. Pump 48 is provided to force the fluid from source 42 through valve 43 to cylinder motor 40. Closure of switch 47 results in activation of solenoid 44 and positioning of the right portion of valve 43 as shown in FIG. 5 in line with the connection between source 42 and cylinder motor 40 thereby causing piston rod 41 to extend.

Switch 47 may be connected to the transmission of the truck so as to be closed only when the truck is in high gear thereby preventing jackknifing at high speeds. The stop block may be retracted and switch opened when the truck is moving at relatively low speeds, such as parking, to allow greater pivotal motion between the trailer and truck. Likewise, switch 47 may be mounted to the dashboard of the truck allowing the driver to control the mechanism by closing the switch.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:
1. A tractor-trailer fifth wheel safety lock comprising:
a truck having a rearwardly extending platform;
a fifth wheel pivotally mounted atop said platform and including a rearwardly opening slot;
a trailer having a main frame with a front edge portion;
a plate fixedly mounted beneath and to said main frame at said front edge portion and including a projection extending down from said main frame into said slot, and a forward edge portion with an arcuate recess with length opening through said forward edge portion and stop surfaces positioned at opposite ends of said recesses, said recess opening through said forward edge portion entirely along said length from one of said stop surfaces to another of said stop surfaces, said recess forms an arc of a maximum angle about said projection;
a stop block movably mounted to said platform;
means connected to said block and operable to move said block into and out of said arcuate recess, said block contactable against said stop surfaces when in said recess to limit relative pivotal movement between said plate and said fifth wheel;
a pair of spaced apart arms fixedly mounted to and beneath said fifth wheel, said arms having proximal ends with said block pivotally mounted therebetween;
said block has a top end and a bottom end with said proximal ends of said arms fastened to said block between said top end and said bottom end;
said means is operable to pivot said top end forward of said block to disengage said block from said plate;
said means includes a cylinder motor mounted to said fifth wheel, a source of pressurized fluid, an electrically operated fluid valve disposed between said motor and said source of pressurized fluid, a source of electrical energy and an electrical switch connecting said source of electrical energy to said electrically operated fluid valve;
said cylinder motor has an extendable piston rod fastened to said bottom end of said block;
said truck includes front wheels turnable through a maximum steering angle not less than the angle of said arc.
2. The tractor-trailer lock of claim 1 wherein:
said truck includes a transmission with said electrical switch connected thereto and with said switch being closable only when said truck is in high gear locking said stop block in said arcuate recess until said truck is out of high gear.

* * * * *